United States Patent Office 3,472,787
Patented Oct. 14, 1969

3,472,787
PREPARATION OF DRIED GEL
John F. Kucirka, Northampton, Pa., assignor to Air Products and Chemicals, Inc., Philadelphia, Pa., a corporation of Delaware
No Drawing. Continuation-in-part of application Ser. No. 347,993, Feb. 24, 1964. This application Jan. 19, 1968, Ser. No. 699,027
Int. Cl. B01j 11/06, 11/82; C01b 33/20
U.S. Cl. 252—432                              16 Claims

ABSTRACT OF THE DISCLOSURE

Dried gel featuring phenomenal uniformity of distribution of metal ion in the matrix is prepared, precautions being taken for minimizing gradients of concentration or gradients of pH in the mixing zone. The plurality of streams of reactants are directed continuously to the mixing zone in such a manner as to provide very small cross-sectional dimensions for each stream. Hot digestion is particularly important. After mixing, the reaction system is heated to from 60° C. to about 105° C., whereby digestion brings about a lowering of pH and a completion of the reaction and a syneresis and shrinkage of the colloidal gelatinous particles so that the digested mixture can settle to provide a lower layer of colloidal gelatinous particles and a supernatant solution substantially free from the gelatinous particles. Water is removed from the digested mixture, and the filter cake is washed, dried and comminuted. The dried gels may be used as pigments, ultra-violet absorbers, ion-exchange solids, catalysts, or for any of the other uses for which multicomponent dried gels might be useful.

CROSS REFERENCE

This application is a continuation-in-part of U.S. patent application Ser. No. 347,993, filed Feb. 24, 1964, and now abandoned.

BACKGROUND

Some aspects of the present invention relate to catalyst compositions of superior catalytic activity and improved physical properties and to methods for producing such compositions. While not necessarily limited thereto, the improved physical properties characterizing some embodiments of the present catalysts are especially important in catalysis carried out at low temperature, particularly as applied to those reactions in which the equilibrium conditions prevailing are highly sensitive to temperature levels.

In the following description of the catalyst composition and method for its preparation particular reference is made as a matter of convenient simplification to catalyst derived from soluble nickel salt and alkali metal silicate. While this is the preferred ortho-para equilibration catalyst it will be understood that the invention is not limited thereto and that the described novel method is applicable to catalysts produced from other starting materials as hereinafter recited, obtaining improved catalysts as compared to those heretofore known.

An important area of use of the preferred catalysts of the present invention is in connection with reactions promoted by paramagnetic substance used as catalysts, such as it is in the reorientation of ortho- and para-hydrogen (isomerization). This reaction is an example of low temperature catalytically-promoted reactions in which the equilibrium product distribution is critically influenced by temperature level. In order that the temperature of the ortho-para hydrogen conversion can be maintained at desired levels it is important that the catalyst employed be one that has good thermal conductivity. This is so, otherwise the exothermic heat of reaction would be taken up in the catalyst with consequent progressive elevation of catalyst temperature. The same principle of temperature maintenance applies in connection with the reverse para-ortho conversion, which is endothermic. The characteristic heat transmitting properties of the present catalyst is due largely to the high degree of uniformity of micelle size, resulting from the special manufacturing method employed as will hereinafter appear. The uniformity of micelle size assures good heat transfer properties in an exothermic reaction or in an endothermic reaction.

The catalytic conversion of ortho to parahydrogen as well as the reverse process is known. In U.S. Patent No. 2,943,917 a process for such conversion is described, utilizing as catalyst a porous bed of heat-activated ferric oxide gel particles. Previous processes, acknowledged in this patent, as most effective of theretofore known prior catalysts, made use of chromia-alumina pellets. Among the objects of the present invention is the production of catalysts having higher order of activity as compared to previous catalysts employed in the described isomerization reactions. This superior activity is achieved in the catalysts of the present invention partly as a result of higher surface area stemming from the novel production process utilized. More particularly the improved activity can be attributed to the uniform chemical composition and structure characterizing the present catalysts. Thus, taking as an example, catalysts prepared from nickel salts and alkali metal silicates, when these catalysts are prepared in conventional manner by deposition of the nickel on a preformed silica base or by coprecipitation of soluble nickel salt and alkali metal silicate heterogeneous mixtures are obtained including with nickel silicate (or silicates) uncombined oxides of nickel and of silica, unreacted nickel salt and undecomposed alkali metal silicate. Since the active catalyst sites are provided by the $SiO_2 \cdot NiO$ combination or complex, the other accompanying impurities lower the activity of the catalyst in that these behave as inactive (or less active) diluents, thus offering substantial areas of surface that are less active or substantially inactive. Moreover, since nickel salt (other than silicate) has a comparatively low sintering temperature, there is formed during the subsequent high temperature activation treatment applied to the catalyst, relatively large particles of fused nickel oxide (NiO). Not only do these large particles of nickel oxide exhibit comparatively little or no catalyst activity because of low surface to mass ratio, but such large particles are further undesirable from the standpoint of their tendency to scatter heat passing through the catalyst to and from the reaction site. In addition, because of the size differential, these large particles of NiO tend to attract to their surfaces the very much smaller particles of nickel silicate which adhere thereto, removing these smaller and otherwise active centers from the region of catalysis. While these disadvantages of conventional prior art catalysts have been described in connection with nickel silicate in particular, it will be understood that similar problems are presented in catalysts of other compositions.

SUMMARY

From the foregoing it will be appreciated that in accordance with certain embodiments of the present invention there are produced catalysts of improved activity and desired high heat conductivity, characterized by regularity of composition and substantial uniformity of particle size. These desired catalyst characteristics are achieved by the novel method of preparation employed in accordance with the invention wherein coprecipitation is effected between a water soluble salt of acidic nature and a basic material in the form of an alkali metal salt of silicic acid or of other inorganic acid, the anhydride of which is a diamagnetic oxide preferably a non-reducible or difficulty reducible metal oxide. Stated more simply, such embodiments of the invention involve acid-base reaction between a water soluble acid salt of a transitional element and a water soluble basic salt under approximately stoichiometric conditions for production of the desired compound or complex. For example, in the production of the preferred nickel silicate catalyst, a water soluble acidic nickel salt is reacted with alkali metal silicate to form by metathesis an active catalyst compound having the formula $$m \cdot NiO \cdot nSiO_2 \cdot xH_2O$$

wherein $m$ and $n$ are whole numbers and the ratio $n:m$ lies between 1 and 4, preferably in the range of 2.5 and 3.5.

Further clarification of the broader aspects of the present invention brings about a recognition that it concerns a method of preparing small particles of sorptive, water-insoluble dried gel material. Although the extraneous water can be removed from the digested, gelatinous slurry by any of several techniques, the solid cake that results can be conveniently described as a filter cake without regard to whether a filter, or a centrifuge, or other separation apparatus is used for the preparation of such filter cake. Any of several methods may be employed for going from the filter cake to an end-product of small particles of dried gel. Certain properties of the dried gel product merit attention, including a bulk density less than 2 grams per milliliter and a surface area greater than 100 sq. meters per grams, said gel comprising a matrix and metal ions uniformly distributed throughout such matrix. The dried gel has a predominantly amorphous structure substantially free from X-ray detectable crystallinity. Although no purpose is achieved by arbitrarily designating a pair of outer limits when only one limit has practical significance, the product might be described as having a bulk density from about 0.1 to 2 g./ml. and a surface area from about 100 to 1000 m.$^2$/g. There must be a precise regulation of the concentration of the components in each of the plurality of solutions. One of the solutions supplied to the mixing zone must be a solution of acid reaction comprising anions of a strong acid. For example, the acid reaction solution might be nickel nitrate, nickel chloride, nickel perchlorate, or the like. One of the solutions must contain the metal ions which are the precursor for the metallic ions uniformly distributed throughout the matrix of the dried gel product. Such metal must not be an alkaline earth metal or an alkali metal, but must be a metal the hydroxide of which is a weak base. One solution must be a precursor for the matrix of the dried gel. Such solutions must contain anions comprising boron, aluminum, silicon, titanium, hafnium, and/or zirconium.

In the mixing zone there are members which are power-driven to provide turbulence within the mixing zone. The streams of precisely regulated concentration are directed at a high velocity and at a temperature below 25° C. to the mixing zone. It is very important that the streams have a small cross-sectional dimension in order that there be no possibility of gradients of concentration and/or gradients of pH within the mixing zone. The flow rates of the solutions are adapted to provide proportions of the anions of strong acid which are from 100% to 120% of the stoichiometric equivalent of the active cations of the solution having an alkaline reaction. The mixing is so controlled as to achieve the freedom from gradients of concentration and freedom from gradients of pH in the mixing zone. The stream leaving the mixing zone is one which flows readily without troublesome back pressure. The residence time of the streams of reactants in the turbulent mixing zone is less than a minute. Although it is sometimes convenient to describe the concentration of the dried gel product in the reaction mixture as less than 100 grams per liter, there are advantages to describing this by an approximately equivalent expression, such as less than ½ mol per liter of slurry.

In describing most embodiments of the generic invention, the minimum for the peak temperature during the digestion step can be set at 80° C., and the digestion range from 60° to 80° C. can be described as a peak temperature appropriate when there is adequate pre-cooling of the reactants. It is generally desirable to provide less turbulence in the digestion zone than in the mixing zone. Of importance is the fact that no component is added or withdrawn from the system during the digestion. The residence time in the digestion zone, that is the time subsequent to leaving the mixing zone, and during the heating to the peak temperature, and during the maintenance at peak temperature, and the processing prior to the removal of the extraneous water all of which is a part of the digestion period, is generally several times greater than the residence in the turbulent mixing zone. Maintenance at the peak temperature can be brief even when the residence time in the digestion zone is prolonged.

One of the important transformations occurring during the digestion concerns washability. The particles become susceptible to washing whereby all soluble alkali metal compounds can eventually be washed from the filter cake if such removal is desired. Without the digestion, there is a tendency for the alkali metal compounds to occlude in the solid particle and not be washed therefrom. The improved washability brought about by digestion is believed to be attributable in part to a syneresis or shrinkage of each particle during the digestion and to the ejection of the alkaline cations from the gelatinous colloidal particles during the elevated temperature digestion. As a result of the digestion, the colloidal particles are of more uniform size. The distribution of charges on the colloidal particles is more uniform as a result of the hot digestion step. Accordingly, after the digestion, the colloidal particles are of such a size and of such a uniform size that, upon cooling and prolonged settling, the digested mixture is susceptible to partial settling to provide a more concentrated slurry of gelatinous particles at the lower portion of a vessel, and a supernatant solution of by-product substantially free from the gelatinous particles. It is ordinarily not desirable to separate the more concentrated slurry from the supernatant solution by decantation, but the susceptibility of such decantation is a feature of the composition which has been subjected to the elevated temperature digestion. The water is removed from the digested mixture to provide a filter cake having a characteristic of being washable to remove substantially all of soluble alkali metal ion compounds therefrom. It may be desirable to prepare a dried gel containing significant amounts of soluble alkali component, and such washing may not always be done. However, the feasibility of alkali removal is significant.

The further clarification of the broader aspects of the present invention, as described hereinabove, are inherent features of procedures of the general type described in Examples 1 to 11. Attention is now directed to three additional features. The metal ion distributed throughout the matrix of the dried gel may be any metal ion of the weak base forming group, such metals generally have soluble nitrates and insoluble silicates. The matrix, although normally of the silica, boria, and/or alumina type, may include titania, zirconia, and/or hafnia. Products having the dried gel structure of the present invention may be used as pigments for coloring fused glass type of enamel, or for applying modified (e.g. decorative, catalytic, and/or for other purposes) surfaces to glasslike materials, or as pigments in paints, plastics, or other products using inorganic pigments, or as a stabilizer for absorbing ultra-violet light, and/or any other end uses for dried gel products. The present method permits preparation of dried gel catalysts suitable, not merely for ortho-para conversion, but also for a variety of other catalytic reactions. Much water softening or other ion exchange has been conducted with dried gels having a mixed oxide matrix, and such usefulness exists for certain dried gels prepared by the present invention.

In the preferred practice of preparing ortho-para equilibration catalyst of highest unit activity, the procedure involves the following steps.

(A) Continuous and thorough mixing of a solution of soluble salt of nickel with an aqueous alkali metal silicate solution in metered proportions maintaining approximate neutrality of the mix during "precipitation" of the formed precipitate usually as gel or gelatinous precipitate. For assurance of repeated uniform good results it is best to first prepare aqueous solutions of the nickel salt and of the alkali metal silicate respectively of such concentrations that a substantially neutral mix or one of desired small acid excess is obtained when these solutions are admixed in equal volumes. With more precise control of processing conditions as hereinafter described, catalysts of less than optimum but yet at acceptably high activity level can be obtained by precipitation in the pH range of about 3 to 9.

(B) The obtained slurry is aged or heated with resulting lowering of the pH thereof, indicative of further reaction taking place to substantial completion.

(C) The extraneous water content of the slurry is then lowered to obtain a solid cake.

(D) The cake is washed to low alkali metal content.

(E) The product is further dried ground to size and activated by heat treatment. The activation treatment can be postponed until use of the catalyst and accomplished at the site in the vessel employed for the reaction to be catalyzed.

Control of operating conditions during this procedure has been found important in obtaining catalytic products of desired high activity and reliable structural uniformity.

Mixing of reagents

The acid-base ratio during precipitation of the nickel silicate should be at least 1:1. With less acid, the activity of the resulting catalyst falls off rapidly. With more acid, a small increase in physical strength and density is obtained, with some increase in catalyst activity noted up to about acid/base ratio of 1.2/1. Such range of acid/base ratios from 1/1 to 1.2/1 corresponds to providing an amount of salt of acidic reaction which is from 120% to 100% that providing the stoichiometric equivalent of the amount of alkaline cation in the alkali metal salt. At higher ratios of acid not only is there waste of acid but the precipitate tends to become rich in nickel with the consequent tendency to produce catalysts having nickel present as NiO or other form converted to NiO producing inactive or less active catalyst sites as already pointed out above.

To assure proper mixing of reagents in the desired proportion, these should be added simultaneously to an already established neutral aqueous bath or to the "heel" from a previous batch. Addition of the acid reagent (nickel salt) to an established bath of the base (silicate) would form a precipitate which is initially rich in silica. On the other hand, addition of the base to an established bath of the acid would result in an initial precipitate rich in nickel. So that even if the reagents were brought together in the batch in ultimate proper proportions, the end result is the production of a reduced quantity of desired reaction product in admixture with unreacted reagents and possible side products with the drawbacks set forth above.

One way of promoting uniformity in reaction by the admixture of the reagents is to introduce these into the aqueous bath at spaced apart locations, in order to minimize concentration of a component and pH gradients. Thus, if a rotary stirrer is employed, one of the reagents may be introduced centrally into the bath and the other peripherally.

Control of pH

The hydrogen ion concentration of the reaction mix is in itself not critical, however, it is important from the standpoint of indicating whether the desired stoichiometry of the reaction is being maintained. It has been found desirable to include an acid buffer in the bath, which may be added with the acidic reagent (with the nickel salt for example). The use of an acid buffer has been found to increase the pore volume of the finished catalyst to substantial extent. Such behavior appears to be anamolous, inasmuch as it would be expected that the slight acidifying effect of the buffer would tend to densify the precipitate, in contradistinction to which the reverse effect has been observed. The buffer apparently serves to prevent localized conditions of higher alkalinity due to yet unreacted alkali metal silicate.

For the full effect of the buffer, it should be present at or near stoichiometric proportions based on the $Na_2O$ (or other corresponding alkaline component) of the base. Thus for each alkali metal ion of the base an equivalent of buffer (based on acid anion) should be employed. For example, using ammonium chloride or other monovalent acide as buffer, two moles will be required per mole of $Na_2O$ in the base. Excess of buffer can be used up to solubility limits but such excess confers no added benefit.

As buffer materials there come into consideration the typical salts of weak bases and strong acids, including ammonium halides, nitrates, sulfates and sulfamates. Other common buffers such as methyl chloride, chloracetic acid and the like also can be used.

In operations employing the buffer particularly, temperature of the reaction bath is an important consideration. Even at moderately elevated temperature, the buffer may react to precipitate the basic silicate. In maintaining low bath temperature as hereinafter discussed and using the buffer therein, there is obtained by their coaction the desired delayed reaction and reduction of undesired nucleation.

As an example of the improved results obtained by the use of a buffer, in following the same procedure there was obtained by addition of the buffer ($NH_4NO_3$) a nickel silicate catalyst having a specific gravity of 0.243 of almost 90% pore volume as contrasted with the control made in the absence of buffer which had a pore volume of less than 40%.

Effect of temperature

It has been found desirable to effect precipitation of the catalytic material at the lowest possible temperature, preferably below room temperature. The freezing point of water is not the lower limit, inasmuch as the freezing point of the reaction mixture is several degrees below 0° C. If desired, non-reacting highly ionized neutral salts may be added—such as sodium chloride—to further lower the freezing point of the reaction mixture, as down to −20° C.

The advantage of low temperature is obtained as a result of delaying the reaction affording time to improve mixing of the reactants before the reaction has proceeded too far. In this way gradients of concentration and of pH are minimized. Moreover, by the delay in reaction, nucleation is impeded so that the number of particles available for growth remains small. The grown particles formed tend to be of larger size for that reason and the presence of very small particles is minimized. This result is advantageous because these small particles have poor pore-forming characteristics, providing only minute pores which would hinder access to the internal active catalytic centers. With increased precipitation temperature there is a corresponding increase in the quantity of very small particles produced.

Effect of agitation

It is important that good agitation be maintained during and even after the precipitation. Such agitation not only obtains the desired intimacy of contact between the reactants with accompanying promotion of product uniformity but further effects shearing through the mass of precipitate and reduction in size of the particles within limits to obtain particles within a more uniform size range and without production of an abundance of extremely small fines. One might expect that as a result of particle size reduction by shearing the density of the catalyst formed therefrom would be increased. The opposite has been observed in practice of the present invention, for reasons not fully explained, since it has been found that the shearing action effects an increase rather than a decrease in the pore volume of the finished catalyst. The effect of shearing is not opposed to that sought in the use of low temperature—avoidance of numerous small particles—since the shearing action is effective only on the larger particles and the small particles are not reduced in size by the proposed agitation. Only the large particles are reduced to a uniform and desirable size range. Thus there is apparently a unique coaction between the use of agitation and low temperature to minimize the range of size distribution and to fix that range at a desirable level.

Preferably the agitation is conducted during precipitation for the effect of intimate mixing of reagents and uniformity of concentration throughout the mass. If agitation is conducted after precipitation has resulted, the effect of the shearing action can still be attained. While agitation of the reaction mixture can be achieved by a rotary stirrer or jet mixer, after the precipitate is formed it is preferred to agitate or shear the precipitate by a colloid mill, shear pump or the like. The effect of continued shearing of the precipitate will be appreciated in comparing the catalyst produced by a procedure involving passing the precipitate of nickel silicate through a colloid mill with control catalyst not so treated. The former had a surface area 542 m.$^2$/g. as compared to the control catalyst which had an area of 479 m.$^2$/g. Not only was there obtained by the post-agitation a 13% increase in surface area but the milled precipitate produced catalyst having a 30% greater activity.

Ordinarily uniform product is more readily achieved when the reagents are introduced in dilute solution (low product concentration). However, if adequate agitation is provided higher concentrations can be employed without untoward effect up to limits of solubility.

Effect of digestion

After precipitation has been achieved, the obtained slurry, including the precipitate and the reaction medium, is digested at elevated temperature, preferably at above 60° C. up to the boiling point of the mixture. Best results have been obtained by bringing the mixture to the boiling point. Agitation is not necessary during digestion except to prevent localized heating and resultant "bumping." At the higher temperatures it is unnecessary to maintain the mixture at that temperature for any length of time. During such digestion the pH of the mixture drops to some extent to a substantially constant level, indicating that the reaction has gone to completion. At digestion temperatures substantially below boiling, the reaction mixture should be held for sufficient time until there is no significant further change in pH. Typically with precipitates of nickel silicate, the pH will drop from a slightly alkaline or neutral point to a level of about 5 or 6 during hot digestion.

It has been found that as a result of the advocated hot digestion there is a significant increase in the activity coefficient of the catalyst.

Washing and drying

The digested precipitate is separated from the slurry by filtering or centrifuging and then washed to remove soluble impurities. Three to five cycles of washing in excess volumes of water are generally sufficient for this purpose. The washed product, after separation of extraneous wash water, is then dried at elevated temperature, as at above 100° C. The upper limit is not critical for most catalysts of the type under consideration except in the case of the more readily air-oxidizable products, such as nickel catalyst, in which the drying temperature should not be above about 150° C.

Activation

The dried product is activated at a temperature in the range of 150°–500° C. The temperature of activation has been found to have an important influence on the activity of the catalyst with the optimum activity being obtained in the heating range of about 275–350° C.; catalyst of notably lower activity are produced when activation is carried out below 275° or above 350° C. To some extent the optimum activation temperature will depend upon the particular catalyst composition. For example, in the case of nickel silicate catalysts, as the proportion of $SiO_2$ to $NiO$ is increased, higher activation temperatures appear to be desirable for optimum activity. In general the heating time for activation should be for at least an hour and preferably about 2–3 hours. Heating for over six hours has not been shown to obtain any advantage.

Depending upon the manner in which the product is to be used, it is then ground to desired size range. For the preferred use of the catalyst in hydrogen nuclear spin isomerization grinding to a size range of about 50–80 mesh is practiced.

EXAMPLE I

The catalyst was made from nickelous chloride ($NiCl_2 \cdot 6H_2O$) and sodium silicate ("N-Brand") of the composition 8.9% $Na_2O$ and 28.7% $SiO_2$ in water.

150 grams of the sodium silicate composition were diluted with distilled water to 7 liters and cooled to 10° C. 135 grams of the nickelous chloride hexahydrate were dissolved in distilled water, diluted to 7 liters and cooled to 10° C. These solutions were run simultaneously into a precipitation tank containing three liters of distilled water at near ice temperature. The nickel solution was added at the center of the tank into the vortex of a rotating solution stirred at a moderate rate while the silicate solution was introduced near the edge of the tank, each being added at controlled constant rate of approximately one liter per minute. The pH during precipitation remained fairly constant at about 5.

After the addition of the reagents was completed, the obtained slurry of nickel silicate was heated to 100° C. with slow stirring over a period of one-half to three-quarter hour. The slurry was filtered on a Buchner funnel, reslurried in 7 liters of distilled water, heated to 80° C. and filtered. Washing and reslurrying was repeated 5 times to effect removal of excess nickelous chloride and soluble salts formed during precipitation. After final filtration, the purified gel product was dried in an air oven at 105° C., cooled and ground to 50–80 mesh size.

Activity of the catalyst was tested after activation for 2 hours in nitrogen at 300° C., in the test vessel. The catalyst in the vessel was swept with hydrogen at room temperature then cooled to −320° F. in liquid nitrogen. The test equilibrium hydrogen was then run in and the percent para hydrogen in the exit gas determined. The quantity of hydrogen converted in unit time per unit weight of catalyst is compared to a standard of unity assigned to a fixed composition ferric oxide gel catalyst. Thus compared, the catalyst of the example showed an activity of 8.

The theoretical reaction for the precipitation is $3Na_2O \cdot 10SiO_2 \cdot xH_2O + 3NiC_2 \rightarrow$
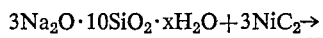
$3NiO \cdot 10SiO_2xH_2O + 6NaCl$ Since there was used in the above example 0.57 mole of nickel salt to 0.215 mole of $Na_2O$ (as silicate) there was present an excess of 0.35 mole unreacted nickel salt which was evidenced by the green colored filtrate liquor.

It should be noted that the sodium silicate solution and the nickel chloride solution were each prepared so that concentrations were precisely regulated. Nickel is a metal, the nitrate of which is soluble, and the silicate of which is insoluble. The silicate ion is the precursor for the matrix, and the nickel is the ion uniformly distributed in the matrix of the dried gel. The mixing zone has power actuated members providing turbulence. The proportions provide chloride ions (anions of a strong acid) which are 100% of the stoichiometric equivalent of the sodium ions, the active cation of the solution having an alkaline reaction. The slurry of gelatinous particles from the mixing zone contained about 153.5 g./17 liters or about 9.04 g./l. of precursors for the dried gel and thus as well below a concentration level of 100 g./l. The stirring during digestion provided less turbulence than in the mixing zone, no component being added or withdrawn during digestion. The filter cake was dried to provide a pulverizable dried gel nickel silicate catalyst in which the nickel ions were uniformly distributed throughout the silica matrix.

EXAMPLE 2

The same procedure was followed as in the preceding example with the exceptions noted employing 73 grams of nickelous perchlorate hexahydrate dissolved in distilled water and diluted to six liters.

208 grams of aqueous potassium silicate (9.05% $K_2O$; 19.9% $SiO_2$) also diluted to six liters with distilled water.

Each of the reagents was cooled to 1° C. and added to the water (4 liters) in the precipitation vessel as spaced streams and at equal controlled volume rates of one liter per minute.

The obtained gel slurry was heated to 100° C. as in the preceding example, filtered and the solids washed five times by reslurrying in water at 60° C. The product was dried at 105° C. and ground to size range.

After activation at 300° C. the obtained catalyst had an activity of 8 as determined by the standard test.

For the foregoing preparation the theoretical reaction can be written

$10K_2O \cdot 29SiO_2 \cdot xH_2O + 10Ni(ClO_4)_2 \rightarrow$
$10NiO \cdot 29SiO_2 \cdot xH_2O + 20KClO_4$ Since there were present in the above preparation approximately 0.2 mole of $K_2O$ and 0.2 mole of divalent nickel salt, these were in substantially stoichiometric proportions.

It should be noted that each of the reactant solutions had a precisely regulated concentration so that the perchlorate ions (anions of a strong acid) were 100% of the stoichiometric equivalent of the potassium ions, the active cation of the solution having an alkaline reaction.

EXAMPLE 3

In the following preparation a number of individual batches were prepared and blended. The general method of preparation followed for these batches was as follows:

The nickel nitrate hexahydrate employed contained by analysis 19.9% by weight Ni. The sodium silicate solution was 40.6–41.6° Baumé containing 8.6–9.1% $Na_2O$ and 28.2–29.48% $SiO_2$, the remainder being chiefly water and less than 0.1% of impurities.

The sodium silicate was diluted to a concentration of 116.2 grams $SiO_2$ per liter and the nickel salt dissolved in water and diluted to a concentration of 43.8 grams NiO per liter. These solutions were pumped through rotameters at equal volumetric ratios and at a rate of 1 to 1.1 gallons per minute into a jet mixer and the mixed product discharged into a jacketed mixing kettle containing a small quantity of water. Precipitation time per batch varied between 30 and 120 minutes with most of batches running at about 90 minutes. During each run frequent observations were made of the pH of the gel and slight adjustment of the rates of the reagents made to maintain pH within the range of 7.1 to 7.4 during precipitation.

Immediately following completion of the precipitation, steam was run into the jacket of the kettle and the temperature of the slurry raised to 190–200° F. as rapidly as possible. When this range was reached the contents of the kettle were permitted to cool while being used in the next processing step. The pH of the slurry after heating ranged from 5.6 to 6.0. Throughout the entire precipitation, heating and storage of the slurry, the kettle was maintained under full agitation.

While the slurry was cooling it was pumped to filter presses for recovery of the solid product. The press cake ranged in moisture content from 70–80%. The filter cake was washed for removal of sodium by reslurrying several times in equal volumes of water and filtering. After analyses and testing of the first several batches, four washes were established as standard.

The washed cake was dried in air for 16 to 18 hours on a tray drier at 220–300° F. to an ignition loss (at 1400° F.) of 12 to 18%. The dried product was ground and screened to 30–50 mesh size.

It should be noted that the hot digestion lowered the pH from 7.1–7.4 to the 5.6–6.0 range.

EXAMPLE 4

To determine the effect of buffering, two batches of nickel silicate catalyst were prepared following the procedure of Example 1, however, adding $NH_4Cl$ as buffer in one of the batches with the nickel salt and in equivalent ratio to $Na_2O$ content (2 moles buffer per mole of $Na_2O$). The catalyst prepared from the buffered composition had 1.2 times the ortho-para equilibration activity of that prepared from the unbuffered solutions.

EXAMPLE 5

To show the effect of temperature, the procedure of Example 1 was followed except that precipitation was effected at 95° C. The catalyst prepared by hot precipitation had an ortho-para equilibration activity of 0.45 times that of the catalyst from precipitation from solutions which had been precooled, that is, cooled to a temperature below room temperature.

EXAMPLES 6 AND 7

One batch of catalyst was prepared by establishing a solution of the nickel salt and adding the sodium silicate thereto while agitating. The catalyst obtained by this procedure was practically inactive for equilibrating a mixture of ortho and para hydrogen.

In following the reverse procedure of adding the nickel salt to the bath of sodium silicate, catalyst of useful activity was obtained. As compared with catalyst prepared in the preferred manner of simultaneous introduction of acidic and basic reagents however, the catalyst prepared by running the nickel salt into the silicate solution had less than half the ortho-para equilibration activity of the other, both catalysts being tested after activation at 300° C.

EXAMPLE 8

A solution of aqueous sodium silicate (N-Brand) containing 3 moles $Na_2O$ to 10 moles $SiO_2$ was diluted to a concentration of 1 mole of $Na_2O$ in 16 liters with distilled water and agitated for 5 minutes in a high speed disperserator at 16,000 r.p.m. and cooled to 1° C. A solution of nickelous chloride was similarly prepared at a concentration of 1 mole in 16 liters of aqueous solution with distilled water and cooled to 1° C.

The two solutions were simultaneously introduced at 1° C. through parallel tubes into a disperserator maintained under agitation at 16,000 r.p.m. at the volume ratio of 1.2 parts nickel solution to 1 part of sodium silicate solution. Precipitation took place at 5.5 pH. The slurry was heated to 100° C. and washed for two days on a filter press. The yield of gel product was substantially 100% based on $Na_2O$ in the silicate. Drying and finishing of the catalyst followed the procedure outlined in Example 1.

Activated at 300° C. and tested as described above, the catalyst showed an activity of 11.6 as compared to the standard iron oxide gel.

It should be noted that a disperserator provides a zone of intense agitation, there being a suction zone at the axis of the impeller rotating at 16,000 r.p.m. The inverted basket type of impeller is foraminous, so that the streams pumped into the central suction zone are ejected centrifugally from the impeller after a very brief residence time in the mixing zone. Both extreme turbulence and an outwardly spiralling stream of product are attributable to the 16,000 r.p.m. foraminous impeller and to the pumping of the streams to the central suction zone of the foraminous impeller. The total procedure of Example 1 can be advantageously conducted using the disperserator type of apparatus in the mixing zone, and still be a procedure in accordance with Example 1. The disperserator type of mixing equipment is employed in several other examples without specific description of the mixing equipment.

Dried gels other than nickel silicate

The previous examples and a large part of the foregoing description relate to preparation of nickel silicate catalyst. Other catalysts can be prepared by the techniques above described. Such catalysts display improved activity as a result of observing the procedural features hereinbefore described which lead to superior uniformity of structure and composition. In general the described method can be employed advantageously in preparing catalysts from salts of metals having an atomic number from 24 to 28 with various bases in the form of soluble alkali metal salts the anion of which is derived from a nonreducible oxide. These bases, of which silicates, aluminates and borates are the principal examples, are salts of acid anhydrides (including amphoteric anhydrides) which are capable of being precipitated by acid salts of the transition elements in aqueous media.

EXAMPLE 9

(a) Following the procedure set out in Example 1 above, nickel borate catalyst was prepared from cooled aqueous solutions of nickelous chloride and sodium metaborate at a product concentration of 84 grams/liter. Solutions of these salts were prepared in distilled water such that an equal volume of the nickel salt solution contained 1.2 equivalents of the borate solution for the reaction

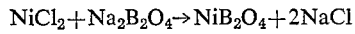

$NiCl_2 + Na_2B_2O_4 \rightarrow NiB_2O_4 + 2NaCl$

Mixing, digestion, solids separation, washing and drying, followed closely the procedure detailed in Example 1. The final catalyst activated at 150° C. showed an ortho-para equilibration activity of 2.73 as compared to unit for the standard control sample.

(b) Catalyst prepared in similar manner from manganous chloride and sodium metaborate, when activated at 150° C., showed an ortho-para equilibration activity of 1.63.

While the preparations specifically illustrated above were made by reaction of a single acidic salt with the base it will be understood that several salts of the described transition elements may be reacted with a single base or several of these bases with one or several salts of the transition elements. One such preparation is illustrated below.

EXAMPLE 10

Nickelous nitrate, cobaltous nitrate and manganous nitrate were each made up to equivalent molarity aqueous solutions (0.15 mole/liter) and these solutions mixed and then reacted with a solution of sodium silicate in equal volume such that there was present 1.2 equivalents of the mixed metal salts to alkali metal. The initial reaction and subsequent processing followed the procedure outlined in Example 1.

The obtained mixed catalyst, activated at 150° C., showed an ortho-para equilibration activity of 2.01 as compared with the standard. This catalyst was also tested as an oxidation catalyst and found effective in conversion of CO to $CO_2$ at room temperature.

While, as has been heretofore indicated, the novel methods of catalyst preparation described can be employed with advantage irrespective of the nature of the acidic and basic components used in the coprecipitation, it is not to be understood that the respective catalyst obtained would necessarily have equally high activity in promoting any given reaction. It has been found, for example, that in general certain types of basic reactants tend to produce higher activity catalysts when used with selected acidic salts of the transition elements. It appears that with bases providing bivalent anions such as silicate, the order of preference is nickel, cobalt, manganese, chromium and iron. When the base provides a trivalent anion, as do borates and aluminates, the order of preference is cobalt, chromium, manganese, iron and nickel.

In the promotion of spin isomerization there appears to be a significant relation between conversion activity and the spin orbital moment of the paramagnetic component of the catalyst. This in part accounts for the special compatibility or synergism exhibited when a trivalent cation of the catalytic component is associated with a trivalent anion or with an anion in which the metal or metalloid element bound to oxygen is in trivalent form. The trivalent matrix provided by the anionic component may induce stabilization of the cationic component of the catalyst in the trivalent state. For example, whereas the silicate of $Co^{II}$ activated at 150° C. shows an activity of 1.68 as compared to the standard test catalyst, the aluminate of $Co^{II}$ shows only low activity (below unity). This low activity exhibited by the $Co^{II}$ on alumina can be attributed to the lower surface area of the alumina based catalyst as well as to the fact that the $Co^{II}$ cation is non-isomorphous with the alumina component. $Co^{II}$ in association with silicate or other divalent or tetravalent anionic component cannot be oxidized to stable trivalent state, in contrast to the situation when the cobalt is associated with a trivalent component such as alumina, in which latter instance such oxidation leads to enhanced catalytic activity despite the lower surface area of the catalyst. The following example illustrates the effect of enhancing catalyst activity by converting the metallic cation to a higher parallel valence state.

EXAMPLE 11

(a) Following the procedure outline in Example 1, cobaltous aluminate catalyst was prepared from equal volumes of aqueous solutions of cobaltous chloride and sodium aluminate, providing 1.2 molar equivalents of cobalt salt per mole of aluminate. This catalyst after activation at 150° C. showed an activity of 0.42 for equilibration of a mixture of ortho and para hydrogen.

(b) The same procedure was followed as before in preparing cobaltous aluminate, however, during digestion of the precipitate there was added to the aqueous medium 1 part of ammonium nitrate to oxidize the $Co^{II}$ to $Co^{III}$. The catalyst thus prepared, activated at 150° C., showed an ortho-para equilibration activity of 2.87.

(c) The same procedure as in (b) above is followed in preparation of $Ni^{III}$ aluminate catalyst. The initial precipitation is effected by reaction of nickelous chloride and sodium aluminate and oxidation to $Ni^{III}$ is effected during subsequent digestion of the obtained precipitate.

While the relation between surface area of the catalyst and activity does not always appear to be borne out except perhaps in connection with reactions promoted by contact catalysis in which surface saturation is rate-controlling, the high surface area of the catalysts prepared by the methods of the present invention may be a significant factor. The siliceous catalysts thus prepared have surface areas in the range of 300 to over 600 square meters per gram after heat treatment up to about 300° C. The surface areas of the trivalent based catalysts, such as aluminates and borates have lower surface areas, yet exhibit acceptably high activity, particularly those having a surface area of about 200 square meters per gram and higher.

As indicated above, uniformity of product is more readily achieved when the reactants are admixed as dilute aqueous solutions. This is observed in the above Examples 1 and 2, for example, in which the solids product concentration ($NiO+SiO_2$) of the reaction mixture is below 10 g./l. With a high degree of mechanical agitation of reactants and initial uniform admixture higher product concentrations are tolerated as in Examples 8 (21 g./l.) and 3 (80 g./l.). In general even under best conditions for uniform admixture it is preferred to stay below 100 g./l. product concentration (based on precipitate formed).

EXAMPLE 12

A catalyst featuring an alumina matrix and silver and/or silver oxide catalytic sites was manufactured in such a manner as to achieve high surface area and high uniformity of microstructure. An acidic solution was prepared having a concentration of about 0.19 molar silver nitrate, and consisting of 323 g. of silver nitrate (1.9 mols) dissolved to provide 10 liters of solution. Similarly a solution having a basic reaction was prepared by dissolving 323.4 g. (2.1 mols) of sodium aluminate tetrahydrate in water to provide 10 liters of 0.21 molar sodium meta aluminate. The acidic solution and the basic solution were each pumped through a heat exchanger to cool each solution to 2° C. Each stream was contained in a tube having a circular cross-section. At the end of each tube, a stream entered the mixing zone through an orifice having a diameter of very small dimension, thereby helping to minimize concentration gradients in the mixing zone. Moreover, the small diameter of the stream at such orifice necessitated a high velocity of the stream. The two streams were pumped from the heat exchanger to a central portion of an inverted foraminous basket type of impeller of a disperserator type of high turbulence mixer. Each stream flowed continuously into the suction zone of the impeller at the rate of 26 liters per hour, so that the disperserator mixed the 20 liters of mixture in about 23 minutes. The power input in the zone of intense turbulence adjacent the impeller was significantly greater than the concentration of power in a zone of a mixer featuring paddles, propellers, or similar means for achieving conventional turbulence in a mixing zone, and the "intense turbulence" terminology is intended to distinguish the concentration of large amounts of power in a small mixing zone from conventional mixing zones. At the disperserator, the streams were mixed in proportions adapted to provide soluble sodium nitrate and insoluble silver aluminate and/or gelatinous mixture of silver oxide and aluminum oxide, the alumina being the matrix in which the silver ions were uniformly distributed. The control of the mixing was adapted to minimize gradients of concentration of ingredients and gradients of pH within the mixing zone.

A stream of intermediate product dispersion flowed readily from the disperserator to a digestion tank without back pressure so that the residence time in the mixing zone adjacent the impeller of the disperserator was relatively brief and less than one minute. The residence time in the digestion zone was relatively long, requiring time for the heat-up and time for the redistribution of colloidal charges and other transformations during digestion. Thus, residence time in the digestion zone was several times greater than in the mixing zone. In order to assure uniform temperature throughout the 20 liters of composition undergoing digestion, stirrers were employed, but the stirrers did not provide as much turbulence as provided for the zone in which the acidic and basic solutions were mixed. In the digestion tank, the initial reaction mixture was heated to a temperature of 100° C., whereby occluded soluble reaction products were shifted from the suspended particles to the solution (thereby imparting washability to the filter cake), and whereby the pH of the solution was lowered, and whereby the reaction was brought to completion, and whereby the colloidal charges were redistributed. If allowed to cool and settle, such digested mixture could form a lower layer of colloidal gelatinous particles dispersed as a more concentrated slurry and an upper decantable layer consisting essentially of an aqueous solution of sodium nitrate substantially free from gelatinous silver aluminate particles. Ordinarily it is desirable to proceed with other steps after hot digestion and the potential decantability after hot digestion is merely further clarification of the transformations achieved by hot digestion, evidencing the redistribution of colloidal charges on the gelatinous particles. No component was added or withdrawn during the elevated temperature digestion.

Separating the aqueous solution containing soluble reaction product salts from the heterogeneous composition to prepare a cake of reaction product was the significant step after the 100° C. digestion. The composition was filtered on a filter press having a plurality of filter pads in a plurality of 4-hole frames, and adapted to permit pressurized washing of the filter cake. After such removal of extraneous water, the filter cake was washed with 75 liters of deionized water. Thus, substantially all alkali metal compounds were removed from the filter cake. The intermediate product was washed with 20 liters of methanol, thus displacing substantially all of the water with methanol. The filter cake was then washed with 15 liters of ether, thereby removing substantially all of the methanol, and providing an etherate of the filter cake.

The filter cake etherate was transferred to a high-pressure apparatus, and the material was heated to about 250° C. at a pressure of about 75 atmospheres, thus being above the 194° C. critical temperature and at a pressure above the 35.5 atmospheres critical pressure of ethyl ether. Then the gas was released from the chamber at a rate such that the chamber was not cooled below the critical temperature of ethyl ether, and the release of the gas was continued until the chamber was at substantially atmospheric pressure. The apparatus was then cooled to room temperature, and the silver aluminate product was removed. Although the composition had a very high surface area, it tended to be hydrophobic, easily wet by hydrocarbons, and difficultly wetted by water. The product had a very low bulk density, and was transformed into a product which could be handled more readily by compression of the powder into tablets using a tableting pressure of about 130 atmospheres. Said tablets were catalyst tablets featuring an alumina matrix and silver oxide catalyst sites.

The catalyst was tested for the preparation of ethylene oxide by the use of a reactor having a length to diameter unit ratio of 11.5, said reactor containing 0.191 g. of the silver oxide-alumina catalyst. The total space gas velocity corresponded to 71,000 volumes of gas per hour per volume of catalyst. The gas mixture consisted of 88% inert gas, 10% oxygen, and 2% ethylene. About one-half part per million by weight of ethylene dichloride was added to the ethylene stream. The gas mixture was passed through the catalyst bed at atmospheric pressure at 190° C. and there was a 30.4% conversion of the ethylene at a selectivity of 79.1% for conversion to ethylene oxide. Said conditions provided 1.04 kilograms of ethylene oxide per kilogram of catalyst per hour. Such results provide a larger amount of ethylene oxide per kilogram of catalyst per hour and a lower temperature of operation as well as more satisfactory selectivity than is typical of commercial production of ethylene oxide. Accordingly, the evidence indicates that said silver oxide-alumina catalyst is superior to some previously employed catalysts for the conversion of ethylene to ethylene oxide.

Such superior performance as a catalyst is believed to be attributable to the combination of the steps in the preparation of the catalytic material, and particularly to the control of the conditions at which the insoluble material is prepared from the plurality of aqueous solutions, such conditions providing a product in which the silver ions are uniformly distributed throughout the alumino matrix. The prevention of gradients of pH and/or concentration during the formation of the insoluble product is believed to account for a significant portion of the superior activity. The possibility of conducting the reaction at the significantly lower temperature is believed to be attributable in part to the very high surface area of the silver-alumina catalyst, which surface area has a high degree of stability by reason of the rarity of the crystal defects or structural defects which have generally characterized high surface area composite materials and strong ionic character of the dispersed metal component. The initially prepared solid material is characterized not merely by a very high surface area, but also by a very low bulk density, giving it a large pore diameter. In the step of pelleting the low bulk density material into tablets, certain changes in the macro-structure occur but not in the micro-structure, and this does not interfere with the catalytic site availability attributable to the uniformity of the micro-structure of the material.

EXAMPLE 13

A catalyst comprising oxides of iron and potassium in an alumina matrix, and having a very large surface area and a very high degree of uniformity of distribution of the iron and potassium atoms was manufactured by a method featuring the hot digestion subsequent to the mixing of solutions in a mixing zone in which precautions were taken to avoid gradients of concentration as the small dimensional streams were fed continuously to the mixing zone. The acidic solution consisted of 0.1 molar solution containing 404 g. of ferric nitrate mono hydrate. The basic solution was also about 0.1 molar and consisted of water and 350 g. of potassium aluminate trihydrate and 60 g. of 90% potassium hydroxide. The solutions were pumped through a heat exchanger maintained at about 25° C., and thence to the suction zone of an impeller, thence through the zone of intense turbulence, and to the digestion vat. Each of the continuous streams had a very small diameter and was pumped at high velocity to the suction zone near the axis of the foraminous impeller of the disperserator. After the two solutions had been thus mixed, and the initial reaction product had accumulated in the digestion vat, the temperature of the digestion vat was raised to 100° C. and maintained at 100° C. for a few minutes, thereby achieving the multiple transformations described in connection with other examples. Then the composition was sent to a four-hole plate and frame filter press, so that the ferric potassium aluminate was accumulated as a filter cake. Inasmuch as the catalyst was designed to contain a significant amount of potassium, no washing of the filter cake with water was conducted. Instead the filter cake was treated with 2.275 liters of methanol followed by an equal volume of ethyl ether. The catalyst etherate was removed as a filter cake, and placed in a pressure vessel from which the gas was removed above the critical temperature of ethyl ether. The dried gel was crushed to a powder. The low bulk density powder was converted to catalyst tablets by pelleting in a tablet making machine. The catalyst was superior in performance as a catalyst for the manufacture of ammonia from a mixture of one volume of nitrogen and three volumes of hydrogen when employed at about 100 atmospheres at about 15,000 volumes of gas per hour per volume of catalyst at 460° C., obtaining about 160% of the ammonia obtained with an equal weight of commercially available Kuhlmann catalyst.

EXAMPLE 14

A catalyst effective for the elevated temperature combustion of hydrogen and oxygen was prepared in a manner providing a uniform microstructure. The acidic solution was 0.4 molar consisting of 968 g. of copper nitrate trihydrate and water. The basic solution was also 0.4 molar with respect to potassium oxide and contained 4,160 g. of potassium silicate having a weight ratio of 2.2 silica to 1 potassium oxide. Each solution was cooled to 0° C., and the small diameter streams were pumped continuously at high velocity to the suction zone of an impeller in a zone of intense turbulence, from which the reaction mixture was transferred to a digestion vat. The aqueous dispersion of copper silicate was heated to 100° C., thereby achieving a multiple transformation, and the digested dispersion was sent to the plate and frame filter press for preparation of a gelatinous filter cake. This was washed with water and then dried at 105° C.

The dried gel was removed, crushed, and classified, and the fraction having a particle size between about 70 mesh and 100 mesh was employed as a catalyst for the formation of water from trace amounts of oxygen in hydrogen. The catalyst is maintained at 200° C., and the hydrogen stream, containing a tiny amount of oxygen contaminant, is catalytically converted to a stream containing a trace amount of steam as a contaminant. The steam is thereafter removed by sorption on a molecular sieve to provide a high purity hydrogen.

The catalyst was tested as a getter for the removal of a known amount of oxygen contaminant in a nitrogen stream. The nitrogen contained 100 p.p.m. of oxygen impurity, and the goal was removing 90% of such contaminant to achieve a nitrogen stream containing only 10 p.p.m. of oxygen as a result of conversion of the copper to copper oxide. The catalyst chamber was 13.7 mm. inside diameter by 72.5 mm. long. The flow rate of the nitrogen stream was 1 standard cubic foot per hour at 200 p.s.i.g. The catalytic bed was maintained at 200° C. during both the oxygen removal stage and during the hydrogenative regeneration of the getter. Because the effective period prior to the breakthrough of more than 10 p.p.m. of oxygen was longer when using the thus prepared getter than for conventional copper getters, the getter was deemed to be effective as an oxygen getter.

It should be noted that the dried gel consisted of a major molar concentration of silica matrix and a minor molar concentration of copper ions uniformly distributed throughout such matrix. The surface area of the dried gel, whether employed in oxidized or reduced form, was greater than 100 m.²/g. and that the bulk density of the dried gel was less than 2 g./ml.

EXAMPLE 15

A zinc silicate stabilizer was prepared having a high degree of uniformity in the micro-structure. One solution had a concentration of about 0.375 molar, and contained 408 g. of zinc chloride, thus having an acid reaction. The basic solution was about 0.375 molar with respect to sodium oxide, and contained 1,266 g. of a sodium silicate having a 1.93 to 1 silica to sodium oxide mol ratio (2 to 1 weight ratio). Each solution was cooled to 0° C., and pumped continuously as a high velocity, small diameter stream into the suction zone of an impeller so that the mixing occurred in a zone of intense turbulence. The mixture leaving the zone of intense turbulence was transferred to a digestion vat, and after the completion of the initial mixting, the vat was heated to 100° C. and maintained at this temperature for approximately 1 minute. Thus the residence time in the digestion zone was several times that in the mixing zone. The composition was then filtered on the plate and frame press, washed with water, and dried at 105° C. and activated at 260° C. The product was comminuted to sub micron size.

During the washing of the sodium chloride from the cake, a portion of the zinc ion was also removed, so that the product contained only 34% zinc oxide instead of the 40.3% zinc oxide attainable by the equations, and so that the silica to zinc oxide mol ratio was 2.62 instead of 1.93 attainable by the equations.

The comminuted zinc silicate was employed as a stabilizer for prolonging the stability of samples of polyvinyl chloride plastic when subjected to U.V. (i.e. ultra-violet) radiation. Sunlight tends to impair the color and/or strength and/or other properties of polyvinyl chloride resin, and a large body of literature is concerned with U.V. absorbers as stabilizers for polyvinyl chloride resins. An especially useful test requires the measurement of the reflectance of a sample after accelerated aging in a chamber having high intensity of ultra-violet radiation, and the ratio of improvement over the blank is noted. In conducting the reflectance test, the amount of reflectance designated as 100% is provided by a white polyvinyl chloride resin strip prepared by heavy loading of titanium dioxide into the precursor. Transparent polyvinyl chloride samples placed over such standard exhibit reflectance values which are large, but less than 100%. If a transparent polyvinyl chloride strip undergoes discoloration during accelerated aging in a chamber having ultra-violet lamps, then its reflectance value is less. If the inclusion of a stabilizer in a formulation permits attainment of a higher reflectance value than in the unstabilized control, the utility of the stabilizer is demonstrated. The accelerated aging tests involve a severity of ultra-violet exposure comparable to many years of normal usage, and the goal is generally to achieve formulations having a tolerable resistance to discoloration by ultra-violet radiation, and not an absolute immunity therefrom.

A control sample of transparent polyvinyl chloride strip was prepared from:

| | Parts by wt. |
|---|---|
| Polyvinyl chloride resin (Geon 101 EP) | 100 |
| Plasticizer, diisooctylphthalate | 45 |
| Polyepoxide plasticizer (Paraplex G 62) | 3 |
| Tin mercaptide clarifier (Thermolite 17) | 2 |

The composition was milled for 5 minutes at about 170° C. and pressed at 170 atmospheres into sample strips having a thickness of about 1.78 mm. (70 mils). The clear sample was exposed on a turntable for 885 hours in a cabinet having one sunlamp and then for an additional 190 hours to two sunlamps in the cabinet. After such 1075 hours of artificial aging, the reflectance was measured and found to be 4%, evidencing significant discoloration during the exposure to ultra-violet radiation.

Samples were prepared using the same procedure as for the control, but modifying the formulation to include, for each 100 parts of polyvinyl chloride resin, a selected amount of zinc silicate stabilizer. The stabilizer concentration is expressed as phr (parts per hundred parts of resin). The reflectance values after the same accelerated aging test were noted. Prior to the accelerated aging test each sample was evaluated for haze, for percentage luminous transmittance, and for reflectance, and the marginal effects of the zinc silicate stabilizer were noted. Data relating to the measurements can be studied in the Table on Zinc Silicate Stabilizers.

Most insoluble metal silicates significantly impair the luminous transmittance of a clear plastic, and the loss of less than 2% transmittance upon loading with 3 phr. of a metal silicate is quite remarkable. The translucency of the gelatinous metal silicates of the present invention resembles the translucency of glass in the visible light range, while acting as an inorganic absorber in the ultra-violet range. Polyvinyl resin compositions containing U.V. stabilizers having less effectiveness than 3 parts per hundred of the zinc silicate have been marketed, but this product constitutes a breakthrough in being a commercially attractive translucent inorganic stabilizer modifying the extent of damage from ultra-violet radiation.

EXAMPLE 16

It is customary to prepare colored bath tubs by forming a siliceous glass coating on a metal base and to use high density pigments for the composition. The extremely high degree of uniformity of dispersion of the metal ions in a matrix which characterizes the products of the present invention has proven to be advantageous in the processing of bath tub coatings. To the extent that a uniform shade of color is desired, the low density supported pigments of the present invention permit the attainment of the desired shade of product with significantly wider ranges for the permissible time and/or temperature of treatment of the bath tub in an oven than has been characteristic of previously available pigments. The effectiveness of smaller amounts of the color-imparting ions in achieving the desired shade make the cost of application of the coloring pigments in accordance with the present invention approximately the same or less than the cost of application for conventional pigments. In addition, the use of single pigments instead of mixtures of pigments, and the advantages in terms of flexibility of control of process conditions impart important commercial advantages to the use of the pigments in the present invention.

In the preparation of bath tubs having decorative surfaces, and prepared by the spraying of an inorganic material through a hot zone onto a conventional bath tub, the pigments of the present invention are outstandingly superior to any other type of pigments evaluated. For example, the silver on alumina catalyst of Example 12, prior to tableting, is effective in such spraying of a refractory colored coating onto a colored bath tub. The spraying of inorganic oxide powders through a plasma arc is described in U.S. Patent 3,264,226. The superior utility of the dried gels of the present invention over any of the many varieties of colored inorganic oxide powders tested in the program concerned with plasma arc spraying of bath tubs exemplifies the outstanding properties of the dried gels of the present invention. White glaze has previously been applied to white bath tubs by plasma spray. Several research laboratories have attempted to spray colored glaze through a plasma torch, but acceptable reliability of uniformity of color was not attained using conventional pigments. The pigments of the present invention were superior in that they provided reliable uniformity of coloration for use in the plasma torch method in which many other pigments had failed. Such superiority is plausibly explained as attributable to the remarkable uniformity of microstructure of the dried gel.

Certain of the previous catalysts of the copper silicate, iron aluminate, and/or other types are effective as supported pigments in the preparation of glazed surfaces,

TABLE ON ZINC SILICATE STABILIZERS

| Zinc silicate, phr. | Prior to severe ultra-violet radiation | | | | | After—Reflectance | |
|---|---|---|---|---|---|---|---|
| | Haze percent | Lum. percent | Trans. Δ percent | Reflectance percent | Δ percent | Percent | Stabilizing ratio |
| 0 | 7.5 | 87.6 | 0 | 79 | 0 | 4 | 1.0 |
| 0.5 | 15.7 | 85.8 | 1.8 | 78 | 1 | 9 | 2.25 |
| 3.0 | 24.8 | 85.7 | 1.9 | 77 | 2 | 27 | 6.75 | and the silver aluminate gel was described merely as an illustrative embodiment.

EXAMPLE 17

A dried gel comprising lead on alumina useful as a supported pigment was prepared by a method in which the gradients of concentration were minimized. In the mixing zone, an impeller of a disperserator is an inverted basket having vertical slot openings. The rotation of this slotted impeller at about 16,000 r.p.m. tends to create a suction zone in the hollow axial zone of the impeller and to create intense turbulence adjacent to the periphery of the rotating impeller. The reagent streams flow in a plurality of tubes, the ends of which are positioned in the suction zone of the impeller. The end of each tube is provided with an orifice desirably significantly smaller than the tube diameter, so that the pressure and velocity of the stream leaving the orifice is significantly greater than that in the tubes going to such orifice. The cross-sectional dimension of the stream leaving the orifice is very small, for example, a diameter of about 1 millimeter. It is important to maintain the critical cross-sectional dimension not greater than about 2 millimeters whether the stream is or is not circular in cross-section. It is the thinness of the stream entering the mixing zone which helps to minimize the possibility of gradients of concentration. Previous technologists favored methods tolerating concentration gradients during periods of time sufficient to permit evolution of lack of uniformity in the micro-structure of the dried gel, and the present method aims at achieving uniformity from initial mixing through end-use.

A sodium aluminate solution having a concentration of about 0.468 molar was pumped to the disperserator simultaneously with the pumping of a solution of 0.6 molar nitric acid containing 0.00835 molar lead nitrate. The solutions interacted to form a dispersion of gelatinous particles of alumina containing lead ions, the unit ratio of aluminum ions to lead ions being about 56. The initial reaction product was withdrawn from the zone of intense turbulence without back pressure and transferred to a vat. A large batch of the dispersion of gelatinous particles was heated to 65° C. and maintained at this temperature for several minutes, and then filtered on a plate and frame press. The dried gel was washed to produce a filter cake having less than about 0.03% sodium oxide. The removal of the sodium so completely after starting with a sodium aluminate was attributable to the changes brought about during the elevated temperature digestion step and to the controls maintained throughout the process for achieving uniformity of microstructure. The filter cake was dried at 300° F. in air in a tray dryer, and then subjected to grinding to provide particles predominantly in a range from about 20 to 40 microns. The lead aluminate dried gel pigment was employed for imparting a beige color to a glaze on a steel substrate. The lead aluminate dried gel was also effective when applied as a decorative deposit by plasma torch. Greater uniformity of color and deposition by plasma torch was achieved than had previously been possible using other pigments. The attractiveness of the dried gels of the present invention for techniques using the plasma torch may be attributable in part to the high degree of uniformity of the distribution of the metal ions throughout the matrix. After production of the powdered dried gel, the particles may, if desired, be calcined at a temperature such as 1000° C. to provide relatively nonporous particles, prior to use in the plasma arc spray procedures. It has not been feasible to measure certain changes in properties during the brief period that particles are in the plasma arc. Without regard to the reasons for the superiority, pigments prepared using the method of dried gel production of the present invention have proven to have significant advantages in the spraying of inorganic materials by plasma torch technology.

EXAMPLE 18

Dysprosium is one of the rare earths having an atomic number of 66 and an atomic weight of about 162.5. An aqueous solution containing 0.0286 dysprosium trinitrate was allowed to react with an aqueous solution containing about 0.0852 sodium alminate, each solution having been precooled to 3° C. prior to injection into the suction zone of a disperserator. The cold slurry was withdrawn from the mixing zone without back pressure, and transferred to a vat where its pH was noted at about 6.5. A batch of the cold slurry was heated to 100° C., thereby bringing about the multiple effects of hot digestion. The product was filtered, washed free of sodium nitrate, dried on a tray dryer at about 250° F., and crushed into a dried gel pigment.

EXAMPLE 19

A dried gel comprising vanadia on silica was prepared by the use of the disperserator mixing equipment. One of the solutions directed to the small orifice of the tube ending in the suction zone of the disperserator contained 0.083 molar vanadate ion supplied as trisodium vanadate or sodium ortho vanadate. The solution also contained sodium silicate to provide 0.84 molar concentration of silica. The total sodium ion concentration was 0.5 molar. The other solution contained 0.5 molar nitric acid. The slurry of gelatinous particles was withdrawn from the mixing zone and transferred to a vat in which a batch of the slurry was heated to 100° C. to bring about the multiple transformations of digestion. The filter cake was separated, washed, and dried and the product was crushed to provide a fine powder in which the vanadia was uniformly distributed throughout the microstructure of the silica, the unit ratio of silicon atoms to vanadium atoms being about 10. The dried gel pigment had effectiveness approximately equal to that of 10 times as much vanadia but had the advantage of permitting a wider range of processing conditions.

EXAMPLE 20

The disperserator apparatus was modified to provide four tubes ending in the suction zone of the impeller and solutions were directed through three of the tubes. A dried gel was prepared by the mixing of three solutions. One solution contained 0.197 molar nickel nitrate. A second solution contained 0.131 molar sodium tetraborate. The third solution contained 0.066 mole of sodium and 0.21 mole of silica in the form of sodium silicate. The initial reaction product was withdrawn from the mixing zone and transferred to a vat in which the hot digestion at 100° C. was conducted. The filter cake was washed, dried, and crushed to a fine powder to provide a pigment having a silica-boria matrix and nickel oxide uniformly distributed in such matrix.

EXAMPLE 21

A dried gel pigment comprising chromia in a matrix of a mixture of titania and aluminia was prepared by steps which followed the general pattern of the previous examples as regards the pumping at high velocity of solutions into the suction zone of a disperserator, withdrawing the initial reaction product, transferring to a digestion vessel, heating to 100° C. to bring about the multiple transformations, filtering, washing the filter cake, drying and crushing to provide a useful pigment powder. The solutions directed to the disperserator were respectively 0.05 molar chromium nitrate, and 0.118 molar titanium trioxalate, and 0.3 molar sodium aluminate. The instantaneous mixing of the three small diameter streams produced the gelatinous slurry in which the uniformity of distribution of the ions was favorable toward the uniform micro-structure of the dried gel.

EXAMPLE 22

A dried gel comprising iron oxide on zirconia was prepared by the procedure taught by the previous examples. Each solution was cooled to 1° C. prior to entering the suction zone. One solution contained 0.125 molar triammonium zirconium hydroxy tricarbonate having the formula $(NH_4)_3ZrOH(CO_3)_3$. The other solution contained 0.1 molar ferric chloride. The gelatinous slurry from the mixing zone was transferred to a digestion vat, and a batch of the slurry was heated to 100° C. The product was separated on a filter press, and the filter cake was washed, dried, and crushed to provide a dried gel comprising iron ions uniformly distributed in a zirconia matrix.

EXAMPLE 23

By a series of tests, suitable limits are established relating to the usefulness of the hot digestion as a step permitting the preparation of high surface area, low density, dried gel products having a high degree of uniformity of microstructure. The concentrations of each reactant must be precisely regulated. The streams must be directed to the mixing zones continuously at high velocity and at the point at which there is any possibility for the mixing to occur, the cross-sectional dimension of the stream must be very small such as less than about 2 millimeters across the critical thinness. The purpose of many of the controls for the mixing zone is the achievement of a uniform structure without troublesome gradients of pH or gradients of concentration within the mixing zone and/or gelatinous particles. The dried gel comprises a matrix in which metal ions are distributed. Such metal ions must be from the group of metals which form weak bases. This group of metals generally forms insoluble silicates and soluble nitrates. The alkali metals and alkaline earth metals form strong bases, and are excluded from the weak base-forming metal group. Many of these metals do not have significant catalytic properties, but the dried gels do have advantages in connection with modifiers (e.g. pigments) for use either in organic coatings or in ceramic glazes. Particular advantages arise in the use of such dried gels in the spraying through a plasma torch.

Various modifications of the invention may be made without departing from the scope of the invention as defined in the appended claims.

What is claimed is:

1. The method of preparing catalyst of improved activity having a high surface area to mass ratio and homogeneity of compositions and structures, which method comprises essentially:
   (1) precooling solutions of (a) water soluble salt of acid reaction providing metal ions of the chromium, manganese, iron, cobalt, nickel, and mixtures thereof group, and (b) soluble alkali metal salt of the silicate, borate, aluminate, and mixtures thereof group; simultaneously adding the precooled solutions of (a) and (b) respectively to a precooled aqueous bath free from substantial excess of either reactant as such and under conditions providing an amount of (a) which is from 120% to 100% of that providing the stoichiometric equivalent of the amount of alkaline ion in the alkali metal salt to prepare a slurry form of reaction mixture comprising precipitated reaction product, the freezing point of the reaction mixture being a lower limit for such precooling;
   (2) further treating and digesting the slurry obtained from (1) the reaction at an elevated temperature above 60° C. for a time at least sufficient to lower the pH of the slurry to substantially constant level indicative of completion of the reaction;
   (3) thereafter removing extraneous water from the digested mixture to obtain a solid cake;
   (4) washing the cake with aqueous liquid to remove soluble alkali metal contaminants;
   (5) and drying the washed cake.

2. In the method of preparing a water-insoluble catalytic material by steps comprising the mixing of a plurality of solutions including a relatively acidic solution with a relatively alkaline solution to form an aqueous system comprising particles of insoluble product dispersed in a solution of by-product, removing extraneous water from the aqueous system to obtain a solid cake, washing the solid cake with aqueous liquid to remove water soluble by-products, and drying the washed cake to provide a water-insoluble catalytic material, the improvement of which includes the steps of: precooling each of the plurality of solutions, one of said solutions being a solution of acid reaction containing cations of the chromium, manganese, iron, cobalt, nickel, and mixtures thereof group, and another of said solutions being a solution of alkaline reaction and containing an alkali metal salt comprising anions of the silicate, borate, aluminate, and mixtures thereof group and alkali metal cations providing an alkaline reaction for said solution; providing a mixing zone comprising a plurality of inlets spaced apart from each other; directing each of the plurality of precooled streams to the spaced apart inlets of the mixing zone, the flow rates of the solutions being substantially the same and uniform and providing the desired proportions of the components in the water-insoluble catalytic material, said desired proportions providing cations of the chromium, manganese, iron, nickel, and mixtures thereof group which are from 100% to 120% of the stoichiometric equivalent of the alkali metal cations of said alkali metal salt and said proportions providing a precipitated product concentration less than 100 grams per liter of reaction mixture, the freezing point of the reaction mixture being a lower limit for such precooling, and said reaction mixture partaking of the nature of a slurry; further treating and digesting the slurry at an elevated temperature above about 60° C. but not greater than the atmospheric boiling point of the mixture for a time at least sufficient to lower the pH of the slurry to substantially constant level indicative of substantial completion of the reaction and removing extraneous water to obtain a solid cake subsequent to such elevated temperature digestion treatment.

3. The method of preparing nickel silicate catalyst of high activity which comprises: precooling aqueous solutions of (a) nickel salt and of (b) alkali metal silicate, said precooling being to a temperature not lower than the freezing point of the reaction mixture; interacting said precooled solutions by their simultaneous introduction into an agitated bath at controlled volume rates in metered proportions and at predetermined individual concentrations of such solutions designed on admixture to form a resulting reaction mixture at a pH in the range of 6 to 9, said bath being maintained free of unreacted excess amounts of either of such reactants throughout the period of such reacting; heating the obtained slurry containing precipitate formed by said reacting to a temperature of above 60° C. and for a time at least sufficient to lower the pH of the slurry to substantially constant level indicative of completion of the reaction; separating the precipitate from the slurry; washing and drying the separated solids; and activating the dried solids at a temperature in the range of 150–500° C.

4. The method according to claim 3 wherein said nickel salt and alkali metal silicate are reacted in the stoichiometric proportions to provide a reaction compound of the formula $mNiO_2 \cdot nSiO_2 \cdot xH_2O$ in which the ratio n/m is in the range of 2.5 to 3.5.

5. The method of preparing a catalyst comprising oxides of cobalt which method comprises essentially:
   (1) effecting coprecipitation between (a) and aqueous solution of a divalent cobalt salt of acid reaction, and (b) soluble alkali metal salt selected from the silicate, borate, aluminate, and mixtures thereof group, said coprecipitation being effected by simultaneous addition of the solutions of (a) and (b) respectively to an aqueous bath free from substantial excess of either reactant as such and under conditions providing an amount of divalent cobalt salt which is from 120% to 100% of that which is the stoichiometric equivalent of the amount of alkaline ion in the alkali metal salt;

(2) digesting the slurry obtained from (1) to further reaction while treating the digesting slurry to the action of an oxidizing agent adapted to convert the cobalt from divalent to trivalent state, and bringing about the substantial completion of the reaction by said digesting;

(3) removing extraneous water from the digested mixture to obtain a solid cake;

(4) washing the cake with aqueous liquid to remove soluble alkali metal contaminants; and (5) drying the washed cake.

6. The method of preparing a catalyst comprising oxides of nickel which method comprises essentially:

(1) effecting coprecipitation between (a) an aqueous solution of divalent nickel salt of acid reaction, and (b) soluble alkali metal salt selected from the silicate, borate, aluminate, and mixtures thereof group, said coprecipitation being effected under conditions providing an amount of divalent nickel salt which is from 120% to 100% of that which is the stoichiometric equivalent of the amount of alkaline ion in the alkali metal salt by simultaneous addition of the solutions of (a) and (b) respectively to an aqueous bath free from substantial excess of either reactant as such;

(2) digesting the slurry obtained from (1) to further reaction while treating the digesting slurry to the action of an oxidizing agent adapted to convert the nickel from divalent to trivalent state, and bringing about the substantial completion of the reaction by said digesting;

(3) removing extraneous water from the digested mixture to obtain a solid cake;

(4) washing the cake with aqueous liquid to remove soluble alkali metal contaminants; and (5) drying the washed cake.

7. Catalyst composed essentially of at least one metal component of atomic number 24 to 28 in association with an anionic component selected from the group consisting of silicate, aluminae, and borate, said catalyst having a surface area above 200 square meters per gram when heat-treated at up to 300° C., and an activity, as measured by low temperature catalytic conversion of a mixture of hydrogen isomers, in a magnitude of at least several times that of standard iron oxide catalyst.

8. Catalyst according to claim 7 composed of nickel silicate and having a surface area above 300 square meters per gram.

9. The method of preparing small particles of sorptive, water-insoluble, dried gel material by steps comprising the mixing of a plurality of solutions including a relatively acidic solution with a relatively alkaline solution to form an aqueous system comprising particles of insoluble product dispersed in a solution of by-product, removing extraneous water from the aqueous system to obtain a filter cake, and preparing small particles of sorptive, water-insoluble material from such filter cake, the improvement which includes the steps of:

(a) preparing each of the plurality of solutions so that the concentration of the component to be included in the water-insoluble material is precisely regulated;

(b) one of said solutions being a solution of acid reaction comprising anions of a strong acid;

(c) one of said solutions containing ions of at least one metal of the Cr, Mn, Fe, Co, Ni, and mixtures thereof group, said metal ions being the precursor for the metallic ions uniformly distributed throughout the matrix of the dried gel product;

(d) one of said solutions being a solution of alkaline reaction and containing anions of the oxides of at least one element of the group consisting of boron, aluminum, silicon, and mixtures thereof, said oxides being the precursor for the matrix of the dried gel product;

(e) providing a mixing zone in which power actuated members provide turbulence;

(f) continuously directing at high velocity and at a temperature below about 25° C. reactant streams of each of the plurality of solutions, said streams being of a very small cross-sectional dimension, to the mixing zone, the flow rates of the solutions providing proportions of anions of a strong acid which are from 100% to 120% of the stoichiometric equivalent of the active cations of the solution having an alkaline reaction, the continuous streams being supplied to the turbulent mixing zone at uniform rates assuring freedom from gradients of concentration and freedom from gradients of pH in the mixing zone, said streams reacting to form a reaction product dispersed in a reaction mixture, there being ready flow of the reaction mixture from the mixing zone without back pressure, the residence time of the streams of reactants in the turbulent mixing zone being less than one minute, and the concentration of each component being such that the concentration of the desired dried gel product is less than 100 grams per liter of reaction mixture;

(g) transferring the reaction mixture withdrawn from the turbulent mixing zone to a digestion zone, and heating the reaction mixture to a temperature above 80° C. while providing less turbulence to the digestion zone than in the mixing zone, no component being added or withdrawn from the system during digestion, the residence time in the degestion zone being several times greater than the residence time in the turbulent mixing zone, said digestion bringing about the formation of a pH lower than that of the inetial reaction mixture, said digestion promoting the completion of the reaction to transform the digested mixture into a heterogeneous composition of insoluble particles in an aqueous system, said digestion promoting the transformation into particles forming a filter cake capable of being washed for removing substantially all soluble alkali metal ion compounds therefrom, said digested mixture being a dispersion of gelatinous particles of sufficient size that upon cooling and standing, a supernatant solution of by-product can be separated by decantation from a lower layer of more concentrated slurry of gelatinous particles;

(h) removing extraneous water from the digested mixture to provide a filter cake having a characteristic of being washable to remove substantially all soluble alkali metal ion compounds therefrom;

(i) washing the filter cake with at least one solvent selected from the group comprising water, lower alkanols, and lower alkyl ethers;

(j) removing at least a portion of the solvent from the washed filter cake to provide a pulverizable dried gel material, said dried gel having a bulk density less than 2 grams per milliliter, and a surface area greater than 100 m.$^2$/g., and said dried gel comprising a major mol concentration of matrix of the class consisting of oxides of elements of the group consisting of boron, aluminum, silicon, and mixtures thereof, and there being distributed uniformly throughout such matrix a lesser molar concentration of metal ions of the Cr, Mn, Fe, Co, Ni, and mixtures thereof group, the dried gel having a predominantly amorphous structure substantially free from X-ray detectably crystallinity.

10. The method of preparing small particles of sorptive, water-insoluble, dried gel material by steps comprising the mixing of a plurality of solutions including a relatively acidic solution with a relatively alkaline solution to form an aqueous system comprising particles of insoluble product dispersed in a solution of by-product, removing extraneous water from the aqueous system to obtain a filter cake, and preparing small particles or sorptive, water-insoluble material from such filter cake, the improvement which includes the steps of:

(a) preparing each of the plurality of solutions so that the concentration of the component to be included in the water-insoluble material is precisely regulated;

(b) one of said solutions being a solution of acid reaction comprising anions of a strong acid;

(c) one of said solutions containing ions of at least one metal of the weak base forming metal group, said group also forming insoluble silicates and soluble nitrates, said metal ions being the precursor for the metallic ions uniformly distributed throughout the matrix of the dried gel product;

(d) one of said solutions being a solution of alkaline reaction and containing anions of the oxides of at least one element of the group consisting of boron, aluminum, silicon, titanium, hafnium, zirconium, and mixtures thereof, said oxides being the precursor for the matrix of the dried gel product, said solution containing active cations promoting such alkaline reaction;

(e) providing a mixing zone in which power actuated members provide turbulence;

(f) continuously directing at high velocity and at a temperature below about 25° C. reactant streams of each of the plurality of solutions, said streams being of a very small cross-sectional dimension, to the mixing zone, the flow rates of the solutions providing proportions of anions of a strong acid which are from 100% to 120% of the stoichiometric equivalent of the active cations of the solution having an alkaline reaction, the continuous streams being supplied to the turbulent mixing zone at uniform rates assuring freedom from gradients of concentration and freedom from gradients of pH in the mixing zone, said streams reacting to form a reaction product dispersed in a reaction mixture, there being ready flow of the reaction mixture from the mixing zone without back pressure, the residence time of the streams of reactants in the turbulent mixing zone being less than one minute, and the concentration of each component being such that the concentration of the desired dried gel product is less than 100 grams per liter of reaction mixture;

(g) transferring the reaction mixture withdrawn from the turbulent mixing zone to a digestion zone, and heating the reaction mixture to a temperature above 80° C. while providing less turbulence to the digestion zone than in the mixing zone, no component being added or withdrawn from the system during digestion, the residence time in the digestion zone being several times greater than the residence time in the turbulence mixing zone, said digestion bringing about the formation of a pH lower than that of the initial reaction mixture, said digestion promoting the completion of the reaction to transform the digested mixture into a heterogeneous composition of insoluble particles in an aqueous system, said digestion promoting the transformation into particles forming a filter cake capable of being washed for removing substantially all soluble alkali metal ion compounds therefrom, said digested mixture being a dispersion of gelatinous particles of sufficient size that upon cooling and standing, a supernatant solution of by-product can be separated by decantation from a lower layer of more concentrated slurry of gelatinous particles;

(h) removing extraneous water from the digested mixture to provide a filter cake having a characteristic of being washable to remove substantially all soluble alkali metal ion compounds therefrom;

(i) washing the filter cake with at least one solvent selected from the group comprising water, lower alkanols, and lower alkyl ethers;

(j) removing at least a portion of the solvent from the washed filter cake to provide a pulverizable dried gel material, said dried gel having a bulk density less than 2 grams per milliliter, and a surface area greater than 100 m.$^2$/g., and said dried gel comprising a major mol concentration of matrix of the class consisting of oxides of elements of the group consisting of boron, aluminum, silicon, titanium, hafnium, zirconium, and mixtures thereof, and there being distributed uniformly throughout such matrix a lesser molar concentration of metal ions of the weak base forming metals, the dried gel having a predominantly amorphous structure substantially free from X-ray detectable crystallinity.

11. The method of claim 10 in which an acid buffer is included in the streams directed to the mixing zone.

12. The method of claim 11 in which the concentration of acid buffer is stoichiometrically equivalent to the alkali ion directed to the mixing zone.

13. The method of claim 10 including the steps of activating the dried gel by heating in the range of 275° to 350° C. for at least one hour.

14. The method of claim 10 wherein nickel ion is the metal ion uniformly distributed throughout the matrix.

15. The method of claim 10 in which a mixture of nickel, cobalt, and manganese ions are the metal ions distributed throughout the matrix.

16. The method of claim 10 in which water is displaced from the filter cake by a lower alkanol, in which alkanol is displaced from the filter cake by a lower alkyl ether, to prepare an etherated filter cake, in which the etherated filter cake is heated under pressure above the critical temperature of the ether in which the ether is vented at an elevated temperature above the critical temperature of the ether, and in which the dried gel is cooled from above such elevated temperature after such venting of the ether whereby the microporosity of the dried gel is formed in the absence of water.

References Cited

UNITED STATES PATENTS

| | | | |
|---|---|---|---|
| 2,088,281 | 7/1937 | Smith | 23—110 |
| 2,204,113 | 6/1940 | Allen | 23—110 |
| 2,529,461 | 11/1950 | Schneiderwirt | 252—317 X |
| 2,640,756 | 6/1953 | Wills | 23—110 X |
| 2,967,822 | 1/1961 | Moy et al. | 252—465 X |
| 3,267,043 | 8/1966 | Mulaskey | 252—432 |

DANIEL E. WYMAN, Primary Examiner

C. F. DEES, Assistant Examiner

U.S. Cl. X.R.

23—52, 59, 110; 252—452, 458, 459, 463, 465, 466

Disclaimer 3,472,787.—*John F. Kucirka*, Northampton, Pa. PREPARATION OF DRIED GEL. Patent dated Oct. 14, 1969. Disclaimer filed June 12, 1969, by the assignee, *Air Products and Chemicals, Inc.*

Hereby disclaims the terminal portion of the term of the patent subsequent to February 7, 1985.

[*Official Gazette April 28, 1970.*]

UNITED STATES PATENT OFFICE
CERTIFICATE OF CORRECTION

Patent No. 3,472,787                            October 14, 1969

John F. Kucirka

It is certified that error appears in the above identified patent and that said Letters Patent are hereby corrected as shown below:

Column 1, line 65, after "as" the word "it" should be omitted. Column 3, line 34, "grams" should read -- gram --; line 55, "solutions" should read -- solution --. Column 6, line 23, "acide" should read -- acid --. Column 8, line 66, formula, before the arrow, "3NiC$_2$" should read -- 3NiCl$_2$ --. Column 9, line 12, "as" should read -- was --. Column 12, line 51, "outline" should read -- outlined --. Column 13, line 25, "nitate" should read -- nitrate --. Column 15, line 7, "alumino" should read -- alumina --. Column 17, line 58, "zince" should read -- zinc --. Column 20, line 6, "alminate" should read -- aluminate --. Column 21, line 45, "compositions" and "structures" should be singular. Column 23, line 44, "aluminae" should read -- aluminate --. Column 24, line 35, after "time in the" the spelling of "degestion" should read -- digestion --; line 38, "inetial" should read -- initial --. Column 25, line 5, "or" should read -- of --; line 59, "turbulence" should read -- turbulent --.

Signed and sealed this 15th day of September 1970.

(SEAL)
Attest:

EDWARD M. FLETCHER, JR.
Attesting Officer

WILLIAM E. SCHUYLER, JR.
Commissioner of Patents